(12) United States Patent
Kang et al.

(10) Patent No.: US 9,160,188 B2
(45) Date of Patent: Oct. 13, 2015

(54) APPARATUS AND METHOD FOR DISPLAYING STRENGTH OF POWER AND EXPECTED CHARGE COMPLETION TIME DURING WIRELESS CHARGING

(75) Inventors: Noh-Gyoung Kang, Seoul (KR); Eun-Tae Won, Seoul (KR); Joon-Ho Park, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 295 days.

(21) Appl. No.: 13/880,695

(22) PCT Filed: Oct. 20, 2011

(86) PCT No.: PCT/KR2011/007850
§ 371 (c)(1),
(2), (4) Date: Apr. 19, 2013

(87) PCT Pub. No.: WO2012/053847
PCT Pub. Date: Apr. 26, 2012

(65) Prior Publication Data
US 2013/0214744 A1    Aug. 22, 2013

(30) Foreign Application Priority Data
Oct. 21, 2010  (KR) .......................... 10-2010-0102884

(51) Int. Cl.
*H02J 7/00* (2006.01)
*H02J 7/04* (2006.01)
(Continued)

(52) U.S. Cl.
CPC ............... *H02J 7/0052* (2013.01); *H02J 7/025* (2013.01); *H02J 7/027* (2013.01)

(58) Field of Classification Search
CPC ............... H02J 17/00; H02J 7/00; H02J 7/02; H02J 7/025; H02J 7/0052; H04B 1/40

USPC ................................... 320/162, 108; 307/104
See application file for complete search history.

(56) References Cited

U.S. PATENT DOCUMENTS

| 7,197,650 B2 * | 3/2007 | Watanabe et al. ............. 713/300 |
| 2003/0218070 A1 * | 11/2003 | Tsikos et al. ............. 235/472.01 |

(Continued)

FOREIGN PATENT DOCUMENTS

| JP | 2008-312294 | 12/2008 |
| KR | 10-2004-0093808 | 11/2004 |

(Continued)

OTHER PUBLICATIONS

International Search Report dated May 23, 2012 in connection with International Patent Application No. PCT/KR2011/007850.

(Continued)

*Primary Examiner* — M'Baye Diao

(57) ABSTRACT

Provided is an apparatus and method for displaying a strength of power and an expected charge completion time during wireless charging. To this end, a first electronic device, upon receiving a power request message, converts stored or wirelessly supplied power into a wirelessly-transmittable form and transmits the converted power. A second electronic device, upon receiving a charging command, determines whether being located in a distance and a position which allow charging with the first electronic device, transmits the power request message to the first electronic device, receives the converted power from the first electronic device to measure the strength of the received power, and calculates an expected charge completion time by using the detected strength of power, if the second electronic device is located in the distance and position which allow charging.

14 Claims, 5 Drawing Sheets

(51) Int. Cl.
*H01F 27/42* (2006.01)
*H02J 7/02* (2006.01)

(56) References Cited

U.S. PATENT DOCUMENTS

| | | |
|---|---|---|
| 2009/0312046 A1 | 12/2009 | Clevenger et al. |
| 2010/0045242 A1 | 2/2010 | Nagashima et al. |
| 2010/0156347 A1 | 6/2010 | Lee et al. |
| 2010/0315039 A1 | 12/2010 | Terao et al. |
| 2010/0320962 A1 | 12/2010 | Sekita et al. |
| 2012/0133339 A1* | 5/2012 | Eguchi .......................... 320/162 |

FOREIGN PATENT DOCUMENTS

| | | |
|---|---|---|
| KR | 10-2006-0080989 | 7/2006 |
| KR | 10-0810261 | 2/2008 |
| WO | WO 2006/001557 A1 | 1/2006 |
| WO | WO 2009/146386 A1 | 12/2009 |

OTHER PUBLICATIONS

Written Opinion dated May 23, 2012 in connection with International Patent Application No. PCT/KR2011/007850.
Extended European Search Report dated Mar. 19, 2015 in connection with European Patent Application No. 11834647.7; 5 pages.

* cited by examiner

Prior Art

APPARATUS AND METHOD FOR DISPLAYING STRENGTH OF POWER AND EXPECTED CHARGE COMPLETION TIME DURING WIRELESS CHARGING

CROSS-REFERENCE TO RELATED APPLICATION(S)

The present application claims priority under 35 U.S.C. §365 to International Patent Application No. PCT/KR2011/007850 filed Oct. 20, 2011, entitled "APPARATUS AND METHOD FOR DISPLAYING STRENGTH OF POWER AND EXPECTED CHARGE COMPLETION TIME DURING WIRELESS CHARGING". International Patent Application No. PCT/KR2011/007850 claims priority under 35 U.S.C. §365 and/or 35 U.S.C. §119(a) to Korean Patent Application No. 10-2010-0102884 filed Oct. 21, 2010 and which are incorporated herein by reference into the present disclosure as if fully set forth herein.

TECHNICAL FIELD

The present invention relates to wireless charging, and more particularly to, an apparatus and method for displaying an expected charge completion time based on a strength of power during wireless charging.

BACKGROUND ART

With the development of modern society, users' preference of portable electronic devices has increased and the electronic devices have become essential for providing a uniquitous environment to users. Various electronic devices which currently support communication functions now move from a communication scheme using a wired cable, such as a telephone line, a network cable, a headphone cable, etc. to a communication scheme using wireless technology, such as Bluetooth, a wireless Local Area Network (LAN), etc. At present, power supply to portable electronic devices is mostly managed by rechargeable batteries, and therefore, the introduction of wireless charging to the field of battery charging may be innovative.

The wireless charging technology is also called wireless power technology in which for example, a battery of an electronic device is charged once the electronic device is put on a charge pad, instead of being connected to a separate charge connector. Generally, a battery of a wireless electric toothbrush or a wireless shaver is charged using the wireless charging technology, which is also known to the public. This technology may improve a waterproof function in a sense that an electronic product is wirelessly charged, and may also improve portability of the electronic product because of not requiring a wired charger.

The wireless charging technology may be roughly classified into an electromagnetic induction scheme using coils, a wireless power transmission scheme which converts an electric energy into microwaves for transmission, and a scheme using resonance. The wireless charging technology will be described in more detail below.

The electromagnetic induction scheme transmits power between a primary coil and a secondary coil. The movement of a magnet in a coil generates induced current, thus generating electricity. That is, a transmission unit generates a magnetic field, such that current is induced according to a change of the magnetic field in a reception unit, thus producing energy. A phenomenon in which current is generated by a coil and a magnet is called a magnetic induction phenomenon. The electromagnetic induction scheme is advantageous in its high energy-transmission efficiency, such that this scheme has been commercialized most in the wireless charging technology, and has been applied to various electronic devices.

The scheme using resonance wirelessly transmits power by using a resonance-based power transmission principle, even when a charging device is located several meters away from an electronic device. This scheme uses the physics concept of resonance in which if a tuning fork is hit, a wine glass near the tuning fork vibrates at the same frequency of the tuning fork. Electromagnetic waves, instead of sound, containing electric energy are resonated to wirelessly transmit power.

The wireless power transmission scheme radiates Radio Frequency (RF)/microwaves to wirelessly transmit power. This scheme is a new concept of power transmission which converts power energy into microwaves favorable to wireless transmission and transmits energy.

An internal structure of an electronic device using the above-described wireless charging technology will be described in detail.

FIG. 1 is a block diagram illustrating an internal structure of a conventional electronic device which is wirelessly rechargeable. In FIG. 1, an electronic device 11 which transmits power and an electronic device 12 which receives power are shown together.

Referring to FIG. 1, the power-transmitting electronic device 11 may include a power conversion unit 101, a communication and control unit 103, and a coil 105. The power conversion unit 101 is connected with the coil 105 for generating a magnetic field, and the communication and control unit 103 controls the power conversion unit 101 to supply power up to a level desired by the power-transmitting electronic device 11.

The power-receiving electronic device 12 may include a coil 107, a power reception unit 109, a communication and control unit 111, and a battery 113. The power reception unit 109 is connected with the coil 107 for power supply and demand. The communication and control unit 111 controls power supplied by the power-transmitting electronic device 11 to the battery 113.

The power-transmitting electronic device 11 shown in FIG. 1 is typically a charging pad, and the power-receiving electronic device 12 is a portable electronic device having a rechargeable battery, such as a mobile terminal. Generally, in the course of wireless charging, a Light Emitting Diode (LED) indication lamp of the power-transmitting electronic device 11 or the power-receiving electronic device 12 is flickered or lighted, and upon completion of wireless charging, the LED indication lamp thereof is lighted in green, as shown in FIGS. 2 and 3.

FIGS. 2 and 3 are diagrams illustrating a conventional wireless charging system. In the system illustrated in FIGS. 2 and 3, a power-transmitting electronic device is a charging pad 201 and a power-receiving electronic device is a portable mobile terminal 203. FIG. 2 shows a state in which wireless charging is in progress, and FIG. 3 shows a state in which wireless charging is completed.

Referring to FIG. 2, once the portable mobile terminal 203 is put on the charging pad 201, wireless charging starts. When wireless charging starts, an LED indication lamp 205 of the portable mobile terminal 203 is flickered or lighted in red to inform a user that wireless charging is in progress.

Referring to FIG. 3, after an elapse of a predetermined time since the portable mobile terminal 203 has been put on the charging pad 201, wireless charging is completed. Upon completion of wireless charging, the LED indication lamp 205 of the portable mobile terminal 203 is flickered or lighted in green to inform the user that wireless charging has been completed.

DISCLOSURE OF INVENTION

Technical Problem

However, the currently used electronic device which supports wireless charging merely supports red and green LEDs which indicate only the in-progress state of charging or completion of charging. In this case, when the LED is lighted in red, the user cannot know how much charging has progressed.

Solution to Problem

Accordingly, an aspect of the present invention is to provide an apparatus and method by which a strength of power currently supplied to an electronic device which supports wireless charging is detected and displayed on a display unit, thereby allowing a user to know whether a position of wireless charging of the electronic device is appropriate and to know a time required for completing wireless charging.

According to an aspect of the present invention, there is provided a method for displaying a strength of power and an expected charge completion time during wireless charging, the method including receiving, by an electronic device, a charging command, determining whether the electronic device is located in a distance and a position, which allow charging, with respect to a counterpart electronic device, if the electronic device is located in the distance and position which allow charging, receiving power from the counterpart electronic device, measuring the strength of the received power and calculating an expected charge completion time by using the measured strength of the received power, and displaying the calculated expected charge completion time.

According to another aspect of the present invention, there is provided an apparatus for displaying a strength of power and an expected charge completion time during wireless charging, the apparatus including a communication and control unit for, upon receiving a charging command, determining whether an electronic device is located in a distance and a position, which allow charging, with respect to a counterpart electronic device, if the electronic device is located in the distance and position which allow charging, receiving power from the counterpart electronic device, measuring the strength of the received power and calculating an expected charge completion time by using the measured strength of the received power, a power reception unit for receiving power from the counterpart electronic device under control of the communication and control unit, and a display unit for displaying the calculated expected charge completion time.

According to another aspect of the present invention, there is provided a system for displaying a strength of power and an expected charge completion time during wireless charging, the system including a first electronic device for, upon receiving a power request message, converting stored or wirelessly supplied power into a wirelessly-transmittable form and transmitting the converted power, and a second electronic device for, upon receiving a charging command, determining whether being located in a distance and a position which allow charging with the first electronic device, transmitting the power request message to the first electronic device, receiving the converted power from the first electronic device to measure the strength of the received power, and calculating an expected charge completion time by using the detected strength of power, if the second electronic device is located in the distance and position which allow charging.

Advantageous Effects of Invention

During wireless charging, a user can be informed of a strength of power currently transmitted to an electronic device, such that the user can change or correct the position of the electronic device. Moreover, by displaying an expected charge completion time based on the current strength of power, user convenience can be provided.

BEST MODE FOR CARRYING OUT THE INVENTION

Hereinafter, an exemplary embodiment of the present invention will be described in detail with reference to the accompanying drawings. In the following description, specific details such as detailed configuration and components are merely provided to assist the overall understanding of an exemplary embodiment of the present invention. Therefore, it should be apparent to those skilled in the art that various changes and modifications of the exemplary embodiment described herein can be made without departing from the scope and spirit of the invention.

Figure 1:
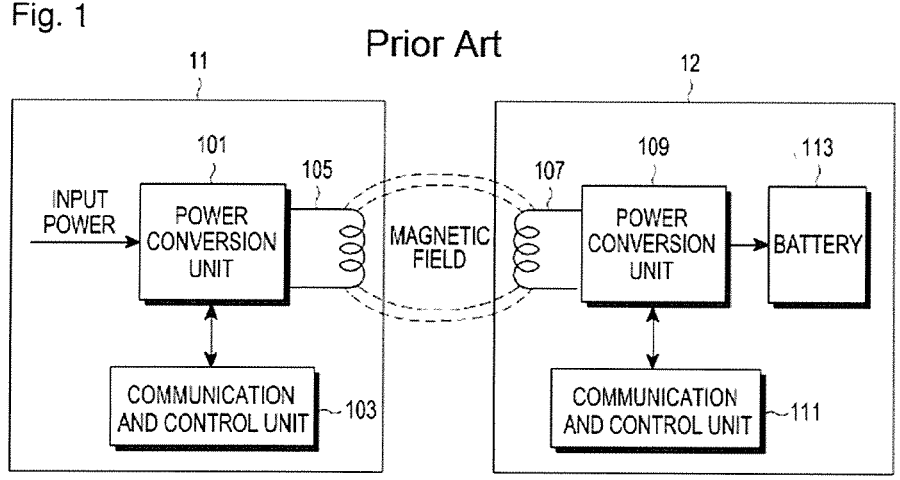
FIG. 1 is a block diagram illustrating an internal structure of a conventional electronic device which is wirelessly rechargeable.
Figure 2:
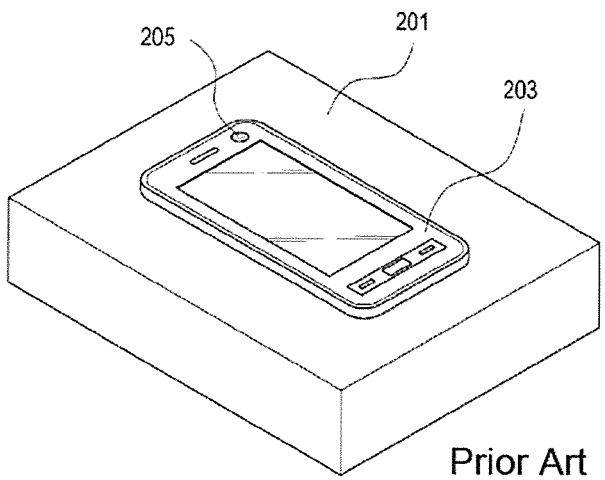
FIGS. 2 and 3 are diagrams illustrating a conventional wireless charging system.
Figure 3:
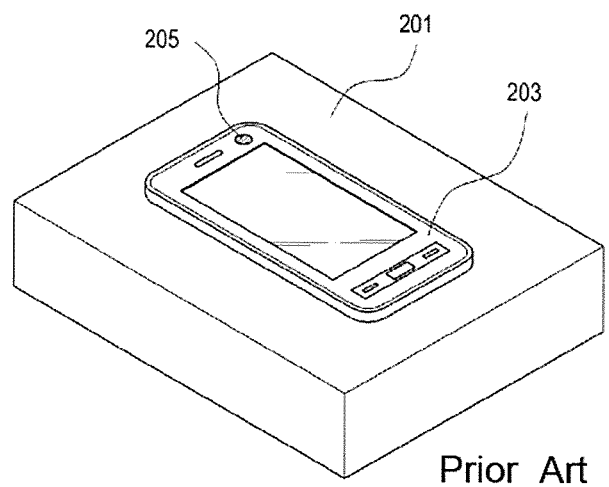
Figure 4:
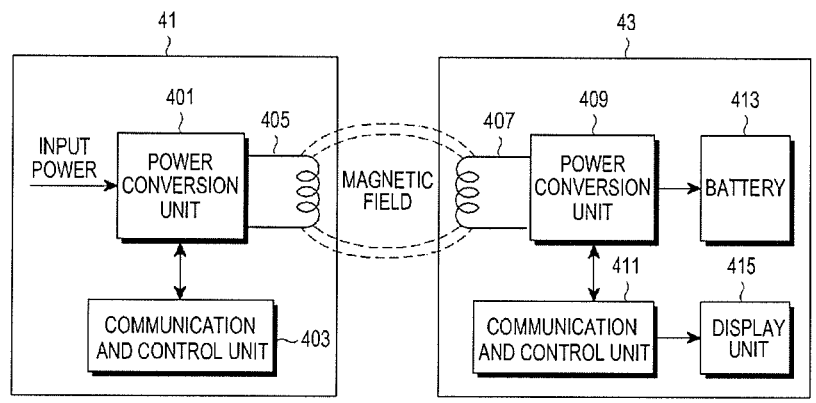
FIG. 4 is a block diagram illustrating an internal structure of an electronic device which is wirelessly rechargeable according to an embodiment of the present invention.

FIG. 4 is a block diagram illustrating an internal structure of an electronic device which is wirelessly rechargeable according to an embodiment of the present invention. In FIG. 4, a power-transmitting electronic device 41 and a power-receiving electronic device 43 are shown together.

Referring to FIG. 4, the power-transmitting electronic device 41 may include a power conversion unit 401, a communication and control unit 403, and a coil 405. The power conversion unit 401 converts input power into a form, which can be wirelessly transmitted, and transmits the power, under control of the communication and control unit 403. The converted power is transmitted through the coil 405 connected to the power conversion unit 401. The communication and control unit 403 controls the power conversion unit 201 to transit power. Although not shown in FIG. 4, the input power may be supplied in a wired manner or may be supplied from a battery disposed inside the power-transmitting electronic device 41. The battery in the power-transmitting electronic device 41, upon receiving a request from the power conversion unit 401, transmits stored power to the power conversion unit 401.

The power-receiving electronic device 43 may include a coil 407, a power reception unit 409, a communication and control unit 411, a battery 413, and a display unit 415. The power reception unit 409, upon receiving the converted power from the power-transmitting electronic device 41, converts the power into power which is available to the battery 413, and transmits the converted power to the battery 413. The power reception unit 409 receives the converted power through the coil 407 connected to the power reception unit 409, basically under control of the communication and control unit 411. The communication and control unit 411 controls the power reception unit 409 to receive power. The communication and control unit 411 measures a strength of the power received by the power reception unit 409 and measures the amount of power required by the battery 413 to calculate an expected charge completion time of the battery 413. The display unit 415 displays the expected charge completion time calculated by the communication and control unit 411.

If a distance between the two electronic devices 41 and 43 and a position of one of the two electronic devices 41 and 43 change, a strength of transmission or reception power also changes. Therefore, the communication and control unit 411 of the power-receiving electronic device 43 calculates an accurate expected chare complete time by measuring a strength of power in real time.

While each of the communication and control units 403 and 411 is shown as a single component in FIG. 4, a communication unit and a control unit may be separated to perform their respective functions.

A description will now be made of a detailed structure of the display unit 415 shown in FIG. 4.

Figure 5:
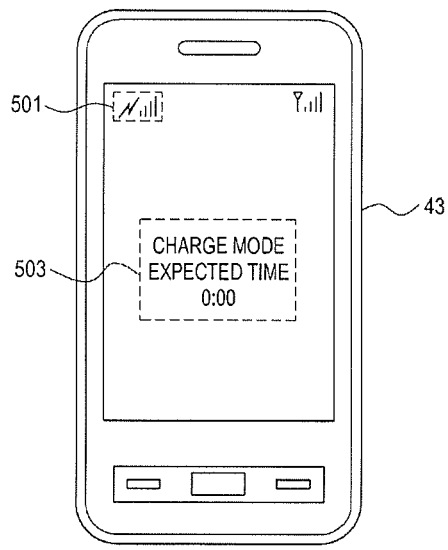
FIG. 5 is a diagram illustrating a structure of a display unit of an electronic device which receives power according to an embodiment of the present invention.

FIG. 5 is a diagram illustrating a structure of the display unit 415 of the power-receiving electronic device 43 according to an embodiment of the present invention. The display unit 415 separately outputs a wireless power display portion 501 and a remaining time display portion 503 when wireless charging is performed. The output of the wireless power display portion 501 means that power is currently received from a power-transmitting electronic device in a wireless manner, and the wireless power display portion 501 may display a strength of received wireless power differently according to the strength of the wireless power. The strength of wireless power is determined depending on a distance and a position with respect to a counterpart electronic device. The remaining time display portion 503 displays an expected charge completion time required until the battery 413 is fully charged, taking account of the strength of the received power and the amount of power currently remaining in the battery 413. The calculation of the expected charge completion time is performed by the communication and control unit 411 shown in FIG. 4.

With reference to FIGS. 4 and 5, a description will be made of a process of displaying an expected charge completion time during wireless charging.

Figure 6:
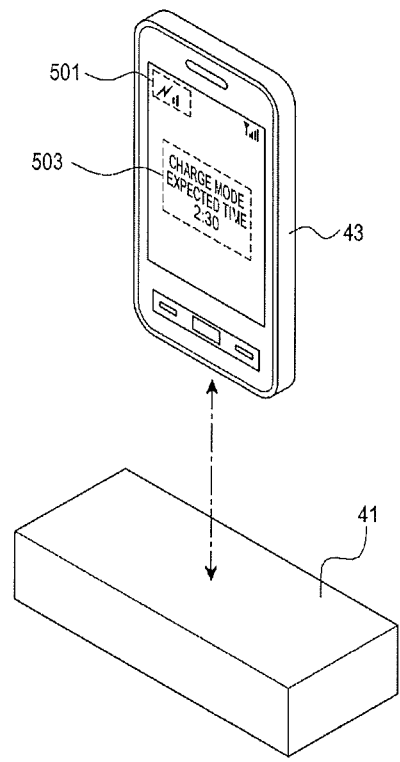
FIGS. 6 and 7 are diagrams illustrating a change of a strength of wireless power with respect to a distance between electronic devices which performs wireless charging according to an embodiment of the present invention.
Figure 7:
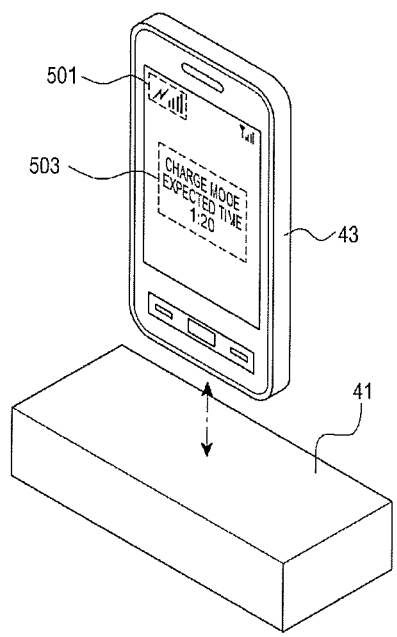

FIGS. 6 and 7 are diagrams illustrating a change of a strength of wireless power with respect to a distance between electronic devices which perform wireless charging according to an embodiment of the present invention. On the assumption that the power-transmitting electronic device 41 is a charging pad and the power-receiving electronic device 43 is a portable mobile terminal in FIGS. 6 and 7, the two electronic devices 41 and 43, which perform wireless charging, are positioned with a relatively long distance therebetween in FIG. 6; the two electronic devices 41 and 43 are positioned with a relatively short distance therebetween in FIG. 7.

Referring to FIG. 6, when a distance between the charging pad 41 and the portable mobile terminal is relatively long within a range in which wireless charging can be performed, the portable mobile terminal 43 measures a strength of power wirelessly received from the charging pad 41 to display the strength of the currently received power on the wireless power display portion 501, and calculates an expected charge completion time to display the expected charge completion time on the remaining time display portion 503. In FIG. 6, the strength of power is indicated with two bars on the wireless power display portion 501, which means that the strength of the received power is not high, and a corresponding expected charge completion time is indicated as 2 hours and 30 minutes on the remaining time display portion 503.

Referring to FIG. 7, when the distance between the charging pad 41 and the portable mobile terminal is relatively short within the range in which wireless charging can be performed, like in FIG. 6, the portable mobile terminal 43 measures a strength of power wirelessly received from the charging pad 41 to display the strength of the currently received power on the wireless power display portion 501, and calculates an expected charge completion time to display the expected charge completion time on the remaining time display portion 503. In FIG. 7, the strength of power is indicated with four bars on the wireless power display portion 501, which means that the strength of the received power is high, and a corresponding expected charge completion time is indicated as 1 hour and 20 minutes on the remaining time display portion 503, which means that wireless charging can be completed within a relatively short time.

Figure 8:
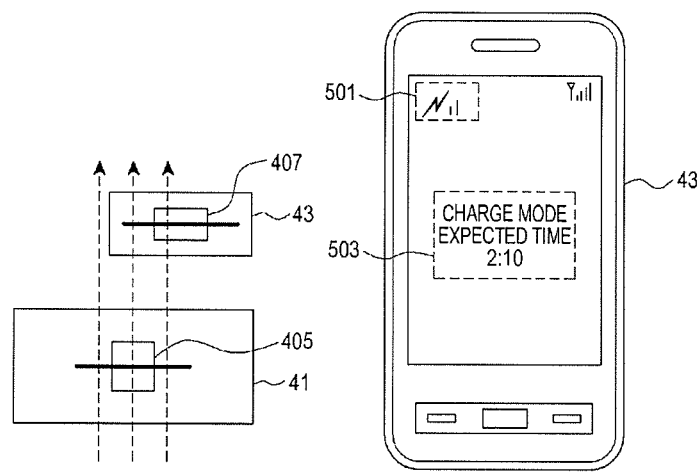
FIGS. 8 and 9 are diagrams illustrating a change of a strength of wireless power with respect to positions of electronic devices which perform wireless charging according to an embodiment of the present invention.
Figure 9:
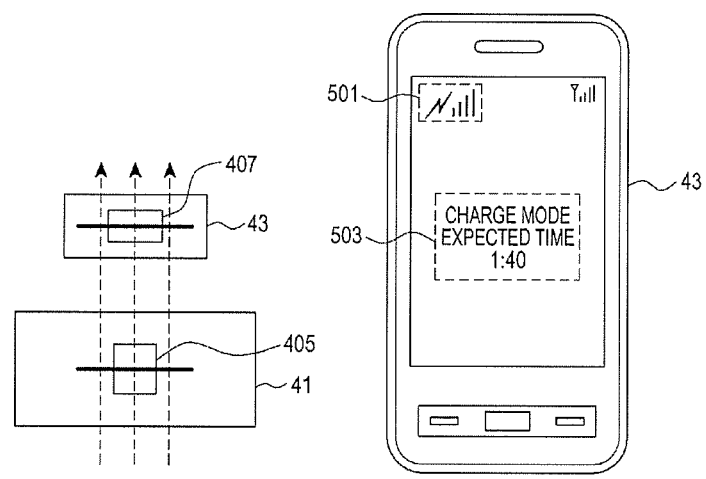

FIGS. 8 and 9 are diagrams illustrating a change of a strength of wireless power with respect to positions of electronic devices which perform wireless charging according to an embodiment of the present invention. Assuming that the power-transmitting electronic device 41 is a charging pad and the power-receiving electronic device 43 is a portable mobile terminal in FIGS. 8 and 9, positions of coils 405 and 407 for transmitting and receiving power for the two electronic devices 41 and 43, which perform wireless charging, are different from each other in FIG. 8; the positions of the coils 405 and 407 are identical to each other in FIG. 9.

Referring to FIG. 8, the coil 407 in the portable mobile terminal 43 and the coil 405 in the charging pad 41 are not positioned collinearly with each other. The portable mobile terminal 43 measures a strength of power wirelessly received from the coil 405 of the charging pad 41 to display the strength of the currently received power on the wireless power display portion 501, and calculates an expected charge completion time to display the expected charge completion time on the remaining time display portion 503. In FIG. 8, the two coils 405 and 407 are not positioned collinearly with each other, such that the strength of power is indicated with two bars on the wireless power display portion 501, which means that the strength of the received power is not high, and a corresponding expected charge completion time is indicated as 2 hours and 10 minutes on the remaining time display portion 503.

Referring to FIG. 9, the coil 407 in the portable mobile terminal 43 and the coil 405 in the charging pad 41 are positioned collinearly with each other. The portable mobile terminal 43 measures a strength of power wirelessly received from the coil 405 of the charging pad 41 to display the strength of the currently received power on the wireless power display portion 501, and calculates an expected charge completion time to display the expected charge completion time on the remaining time display portion 503. In FIG. 9, the two coils 405 and 407 are positioned collinearly with each other, such that the strength of power is indicated with four bars on the wireless power display portion 501, which means that the strength of the received power is high, and a corresponding expected charge completion time is indicated as 1 hour and 40 minutes on the remaining time display portion 503.

As in the foregoing embodiment, the portable mobile terminal 43 may calculate an expected charge completion time by measuring a strength of power which changes according to a distance and a position with respect to the charging pad 41.

Figure 10:
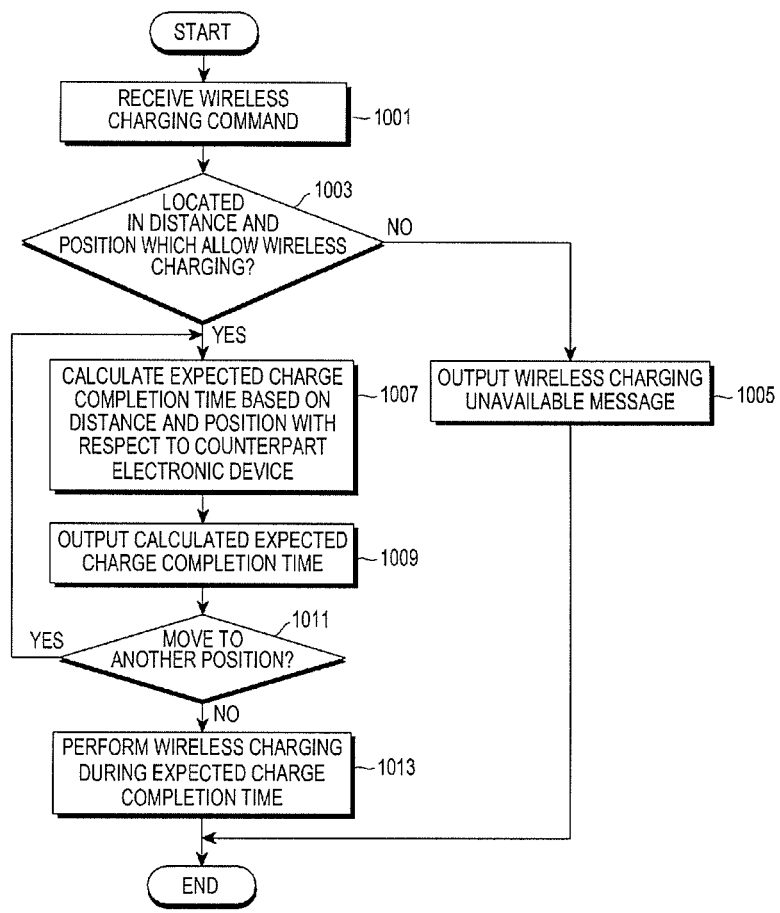
FIG. 10 is a flowchart illustrating a process of measuring a strength of power and displaying an expected charge completion time during wireless charging according to an embodiment of the present invention.

FIG. 10 is a flowchart illustrating a process of measuring a strength of power and displaying an expected charge completion time during wireless charging according to an embodiment of the present invention.

Referring to FIG. 10, a power-receiving electronic device receives a wireless charging command from a user in step 1001. In step 1003, the power-receiving electronic device which receives the wireless charging command determines whether being located in a distance and a position which allow wireless charging. A criterion for the determination is whether a power-transmitting electronic device exists within a preset range from a position of the power-receiving electronic device, and if the power-transmitting electronic device exists within the preset range, the power-receiving electronic device transmits a power request message to the power-transmitting electronic device and the power-transmitting electronic device having received the power request message wirelessly supplies power to the power-receiving electronic device. If the power-transmitting electronic device does not exist within the preset range, the power-transmitting electronic device outputs a wireless charging unavailable message to an output unit of the power-receiving electronic device in step 1005, and wireless charging is terminated.

In step 1007, the power-receiving electronic device calculates an expected charge completion time based on a distance and a position with respect to the power-transmitting electronic device. The expected charge completion time is calculated by measuring a strength of received power, and the strength of power is determined depending on a distance between the two electronic devices and positions of coils included in the two electronic devices, respectively. For example, as a distance between the two electronic devices increases, a strength of power decreases and a corresponding expected charge completion time increases. The strength of power when the coils included in the two electronic devices are not positioned collinearly with each other is lower than that when the coils are positioned collinearly with each other; and the expected charge completion time in the former case is longer than that in the latter case. In step 1009, the power-receiving electronic device outputs the calculated expected charge completion time to the output unit. The strength of the power measured in step 1007 is also output to the output unit. The strength of power may be output using preset steps, for example, a number or a bar graph.

In step 1011, the power-receiving electronic device determines whether the power-receiving electronic device or the power-transmitting electronic device moves to another position. Such determination may be based on the strength of received power, such that if the strength of received power changes, the process goes back to step 1007 to measure the strength of power again, calculate the expected charge completion time again by using the measured strength of power, and output the calculated expected charge completion time. If the strength of power does not change in step 1011, the process goes to step 1013 to perform wireless charging during the calculated expected charge completion time.

While the invention has been shown and described with reference to a certain exemplary embodiment thereof, it will be understood by those skilled in the art that various changes in form and details may be made therein without departing from the spirit and scope of the invention as defined by the appended claims and their equivalents.

The invention claimed is:

1. A method for displaying a strength of power and an expected charge completion time during wireless charging, the method comprising:
   receiving, by an electronic device, a charging command;
   determining, whether the electronic device is located in a distance and a position which allow charging with respect to a counterpart electronic device;
   in response to determining that the electronic device is located in the distance and the position which allow charging, receiving power from the counterpart electronic device;
   measuring the strength of the received power;
   calculating an expected charge completion time using the measured strength of the received power; and
   displaying the calculated expected charge completion time.

2. The method of claim 1, wherein determining whether the electronic device is located in the distance and the position which allow charging comprises determining whether the counterpart electronic device is present within a preset range.

3. The method of claim 2, further comprising, in response to determining that the counterpart electronic device is not present within the preset range, outputting a charging unavailable message and terminating the charging.

4. The method of claim 1, further comprising determining positions of a coil of the counterpart electronic device and a coil of the electronic device to determine whether charging is available.

5. The method of claim 1, wherein calculating the expected charge completion time comprises:
   measuring the strength of the currently received power based on the distance and position with respect to the counterpart electronic device and measuring an amount of power remaining in the electronic device; and
   calculating the expected charge completion time using the measured strength of power and the measured amount of power remaining in the electronic device.

6. The method of claim 1, further comprising:
   displaying the strength of the received power; and
   measuring and displaying the strength of the received power each time the distance and the position of at least one of the electronic device and the counterpart electronic device changes.

7. The method of claim 6, further comprising, in response to measuring a new strength of power during wireless charging, recalculating the expected charge completion time using the new strength of power.

8. An apparatus configured to display a strength of power and an expected charge completion time during wireless charging, the apparatus comprising:
   a communication and control unit configured to, upon receiving a charging command, determine whether an electronic device is located in a distance and a position which allow charging with respect to a counterpart electronic device in response to determining that the electronic device is located in the distance and the position which allow charging, receive power from the counterpart electronic device; measure the strength of the received power; and calculate an expected charge completion time using the measured strength of the received power;

a power reception unit configured to receive power from the counterpart electronic device under control of the communication and control unit; and a display unit configured to display the calculated expected charge completion time.

9. The apparatus of claim 8, further comprising a battery configured to store the received power.

10. The apparatus of claim 8, wherein the communication and control unit is configured to determine whether the counterpart electronic device is present within a preset range, and in response to determining, that the counterpart electronic device is not present within the preset range, the communication and control unit is configured to calculate an expected charge completion time based on the distance with respect to the counterpart electronic device.

11. The apparatus of claim 10, wherein in response to determining that the counterpart electronic device is not present within the preset range, the communication and control unit is configured to output a charging unavailable message and terminate the charging.

12. The apparatus of claim 9, wherein the communication and control unit is configured to measure the strength of the currently received power based on the distance and the position with respect to the counterpart electronic device, measure an amount of power remaining in the electronic device, and calculate the expected charge completion time using the measured strength of power and the measured amount of power remaining in the electronic device.

13. The apparatus of claim 8, wherein the display unit is configured to display the strength of the received power and update the strength of the received power each time the distance and position of at least one of the electronic device and the counterpart electronic device changes.

14. The apparatus of claim 9, wherein the communication and control unit is configured to remeasure the strength of the received power and recalculate the expected charge completion time when the electronic device comprising, the communication and control unit or the counterpart electronic device is moved.

\* \* \* \* \*